United States Patent [19]
Squire

[11] Patent Number: 5,062,023
[45] Date of Patent: Oct. 29, 1991

[54] DISK FILE SERVO LOOP WITH IMPROVED TRACK SETTLING

[76] Inventor: John S. Squire, 1105 Clydebank Ct., Sunnyvale, Calif. 94087

[21] Appl. No.: 509,051

[22] Filed: Apr. 13, 1990

[51] Int. Cl.$^5$ .......................... G11B 5/55; G11B 21/08
[52] U.S. Cl. .............................. 360/78.04; 360/77.02; 369/44.28
[58] Field of Search .......................... 360/77.01–77.11, 360/78.01, 78.04–78.14; 369/32, 33, 41, 43, 44.28, 44.29, 44.35; 318/561, 592, 596, 611, 615, 621

[56] References Cited

U.S. PATENT DOCUMENTS 4,516,177  5/1985  Moon et al. ...................... 360/77.08
4,783,705  11/1988  Moon et al. ...................... 360/77.08

OTHER PUBLICATIONS

R. K. Oswald, "Design of a Disk File Head-Positioning Servo", *IBM Journal of Research and Development*, Nov. 1974, pp. 506–512.

*Primary Examiner*—Aristotelis Psitos
*Assistant Examiner*—Steven R. Garland
*Attorney, Agent, or Firm*—David B. Harrison

[57] ABSTRACT

Reduced integration time within a lead-lag compensation circuit within a disk drive head positioner servo loop is reduced in the presence of a feed back position error signal which includes a bias force component. The compensation circuit including an integrating capacitor and a high value resistor through which the integrating capacitor is charged by the position error signal. Charging time of the integrating capacitor is reduced during track settling by a parallel resistance switchably connectable across the high value resistor for lowering the resistance thereof. A switch, such as a field effect transistor in series with the parallel resistance, connects the parallel resistance across the high value resistor in response to a switching signal. A control circuit, such as a system microprocessor, is responsive to the head positioner servo loop and generates the switching signal to cause the switch to connect the parallel resistance means across the high value resistor during a settle interval immediately following completion of track seeking when the servo loop is functioning in a track following mode and before track seeking is complete.

6 Claims, 2 Drawing Sheets

FIG.-1 DISK DRIVE 10

DISK FILE SERVO LOOP WITH IMPROVED TRACK SETTLING

FIELD OF THE INVENTION

The present invention relates to fixed disk drive head positioner servo loops employing voice coil positioners. More particularly, the present invention relates to a fixed disk drive servo loop having improved dynamic track settling time response characteristics in response to a non-zero bias force acting upon the voice coil positioner.

BACKGROUND OF THE INVENTION

Head positioner servo systems for disk files are well understood. For example, the principles of disk file servo systems, as applied to a specific IBM disk file design: the 3340, are explained and compared in an article by Dr. Richard K. Oswald entitled "Design of a Disk File Head-Positioning Servo", *IBM Journal of Research and Development,* Nov. 1974, pp. 506-512. Disk file positioner servos provide essentially two functions: track seeking or accessing, and track following. Ideally, a track seeking servo configuration should be able to move the data head between two tracks in the minimum possible time, while the track following servo configuration should maintain the head at the centerline of a track being followed. These two quite different functions require different control circuit configurations for practical implementation, even though the same actuator structure, actuator driver circuit and mechanical system components are used for both tasks.

A third, transitional mode, known as track settle, covers the situation where the track seeking servo has completed its task, and the servo circuitry has switched to the track following configuration, but the head transducer has yet to stabilize at the destination track location. Since read and write operations cannot be accomplished until the head has stabilized at the desired track location, it is most desirable to minimize settle time.

Typically, current mode driver circuits are used to drive voice coil actuator structures. The use of a current mode driver circuit results in very fast current and force risetimes within the actuator, leading to improved track access time characteristics. Using a current mode driver, however, requires loop compensation, typically in the form of a lead-lag phase compensation network. The lead-lag network provides necessary damping and prevents the servo loop from appearing to be a simple harmonic oscillator.

In rotary voice coil actuator structures, such as shown in commonly assigned U.S. Pat. Application Ser. No. 07/192,353, now U.S. Pat. No. 5,005,089, filed on May 10, 1988, bias forces are present which bias the actuator in one direction. One source of bias force is presented by a flexible circuit structure which is provided to connect the actuator coil and head read/write preamplifier and switching circuitry to stationary circuitry mounted to the base. These bias forces may be considered as an offset signal which adds to or subtracts from the actuator current used to correct head position to track centerline during track following operations.

With non-zero bias force, the lead-lag compensator network of the track following servo loop must integrate the position error in order to provide a proper drive current. This integration classically creates a long settle time or "tail" in the settling position error signal because the integrator circuit gets charged through a very large series resistor from a source of the PES. Reducing the value of the resistor during track following operations reduces the phase margin and may result in instability of the track following servo loop during track following.

Thus, a hitherto unsolved need has arisen for a disk file head position servo loop which may dynamically change loop compensation characteristics during track settling and which maintains a sufficiently wide phase margin during track following to provide stability to the actuator structure.

SUMMARY OF THE INVENTION WITH OBJECTS

A general object of the present invention is to provide a disk file head positioner servo loop with a dynamically modifiable loop compensation characteristic during track settling operations in a manner which overcomes limitations and drawbacks of the prior art.

A more specific object of the present invention is to cause a digital microcontroller to improve track settling characteristics of force biased voice coil head positioner analog servo loop by dynamically changing the characteristics of an integrator within a phase lead-lag compensation network during track settling.

In accordance with the principles of the present invention, a lead-lag compensation circuit within a disk drive head positioner servo loop integrates a fed back position error signal which includes a bias force component. The compensation circuit including an integrating capacitor and a high value resistor through which the integrating capacitor is charged by the position error signal. Charging time of the integrating capacitor is reduced during track settling by a parallel resistance switchably connectable across the high value resistor for lowering the resistance thereof. A switch, such as a field effect transistor in series with the parallel resistance, connects the parallel resistance across the high value resistor in response to a switching signal. A control circuit responsive to the head positioner servo loop generates the switching signal to cause the switch to connect the parallel resistance means across the high value resistor during a settle interval immediately following completion of track seeking when the servo loop is functioning in a track following mode and before track seeking is complete.

In one aspect of the present invention, the compensation circuit includes an operational amplifier, and the integrating capacitor is within a feedback path between an output of the amplifier and an inverting input thereof.

In a further aspect of the present invention the field effect transistor switch has a source-drain path in series with the parallel resistance means, and a gate path leading to the control circuit.

In one more aspect of the present invention, the control circuit includes a programmed digital microprocessor controller for controlling head positioning operations of the disk drive in accordance with data storage and retrieval requests received by a host computing system with which the disk drive is operating.

In a related aspect of the invention, the digital microprocessor controller generates a seek complete signal for signalling completion of track seeking, and times the seek complete signal in relation to the end of the switching signal.

These and other objects, advantages, aspects and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

Figure 1:
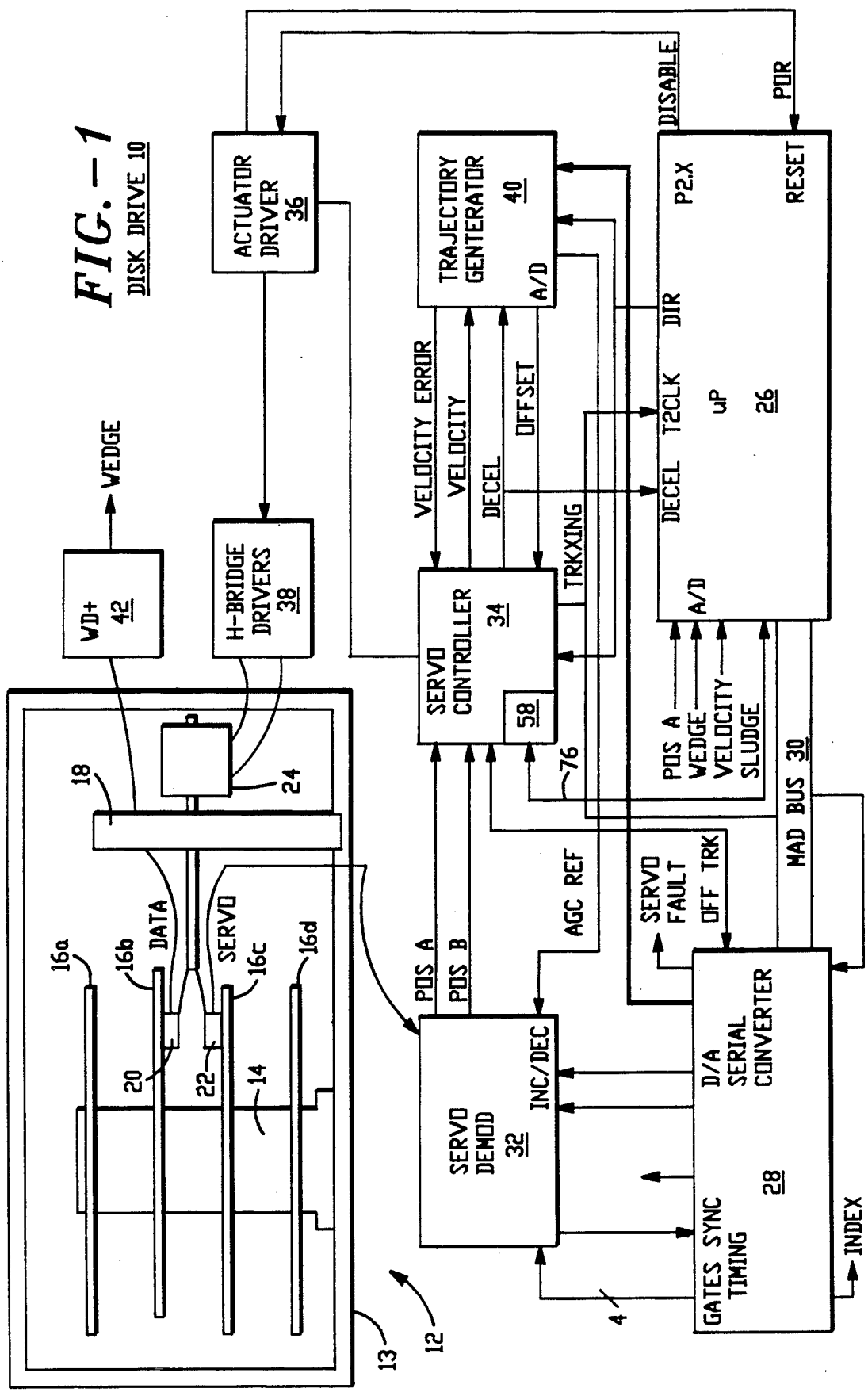
FIG. 1 is a structural block diagram of a fixed disk file head positioner servo loop.

In order to understand the present invention, a brief environmental discussion ensues. With reference to FIG. 1, a fixed disk drive 10 includes a head and disk assembly 12. The head and disk assembly 12 includes a base 13, a disk spindle 14 which is rotated relative to the base 13 by an in-hub spindle motor (not shown), and e.g. four non-removable magnetic media storage disks 16a, 16b, 16c and 16d. Each disk 15 includes two major storage surfaces, and the disk 16c has the uppermost one of its surfaces devoted entirely to factory prerecorded servo information. Every other storage surface is available for storage and retrieval of user data, and each concentric data storage track includes a single servo sector marked by an index pulse generated once per revolution of the disk spindle 14. Preferably, although not necessarily, the disks 16 are micro-Winchester disks, each having a diameter of approximately 95 millimeters.

A mass balanced rotary actuator structure 18 supports and positions a data transducer head 20 for each data surface, and a servo transducer head 22 for the servo surface. These heads 20 and 22 "fly" in close proximity to the adjacent disk surface upon an air bearing effect which characterizes Winchester technology. FIG. 1 shows only one data transducer head 20, although in practice there would be seven data transducer heads 20 commonly mounted and positioned by the actuator structure 18. An actuator voice coil motor 24, formed by a flat coil moving within a field formed by one or more permanent magnets fixed to the base 13, moves the actuator structure 18, so that the heads move along an arc across the disk surfaces, from an outermost region to an innermost region.

Turning now to the electrical system, overall control of the disk drive 10 is provided by a single microprocessor 26 which supervises data transfer operations of the disk drive 10 with a host computing system, and which also supervises head positioning operations of the disk drive 10. The microprocessor 26 may be a 16 bit microcontroller, such as type 8096 made by Intel Corporation, Santa Clara, CA, or equivalent. In order to carry out head positioning operations, the disk drive 10 further includes a timing generator 28 connected to the microprocessor 26 by a timing bus 30. The timing generator 28 generates all of the timing signals and pulses needed for the operation of the head positioning servo system within the disk drive 10.

The head positioning servo system of the disk drive 10 includes a servo demodulator circuit 32 which is connected to receive the servo track information read by the servo head 22 and to generate therefrom a POS A and a POS B signal pair in quadrature. A servo controller circuit 34 receives the POS A and POS B signals as well as certain control signals and generates a position error signal which is applied to an actuator driver circuit 36. The actuator driver circuit 36 drives H-Bridge power amplifiers 38 which control current flow and direction through the actuator coil 24 in order to cause the actuator structure 18 to move from track to track during track seeking operations and to follow a particular track centerline during track following operations.

A trajectory generator 40 compares actual velocity against a reference seek profile trajectory for each seeking operation, and generates and puts out a velocity error signal to the servo controller 34 during seeking operations in order to optimize acceleration and deceleration characteristics of the actuator 18 in carrying out track seeking operations.

The servo demodulator 32 may be a type ML 4401 chip; the servo controller 34 may be a type ML 4403 analog servo controller chip; the actuator driver circuit 36 may be a type ML 4402 chip; and, the trajectory generator 40 may be a type ML 4404 chip. These integrated circuits are made by Micro Linear Corporation, and together as shown in FIG. 1 form a classic disk drive servo loop closed about the servo surface and head 22.

A wedge circuit generates and puts out sequential wedge servo analog values as a selected data head passes over the single servo sector of the data track being followed in order to provide a fine position reference for the data surface and to compensate for any positional discrepancy (called "tilt") between the servo surface and the selected data surface being followed. The wedge servo analog values are converted to digital values by an analog-to-digital converter within the microprocessor 26. The digital wedge values are then processed into a wedge offset value which is applied to the servo controller 34 in order to correct the servo centerline following information provided by the POS A and POS B signals. It will be appreciated by those skilled in the art that the rotary actuator structure 18 may react to bias forces which bias the actuator structure in one direction or another. The bias forces may result from a flexible circuit, such as a flat mylar film, carrying conduction paths to the voice coil and to circuitry relating to the read/write heads. The bias forces may also stem from aerodynamics within the enclosed head and disk assembly 13.

Irrespective of cause, the bias force applied to the actuator structure 18 is cancelled by a current from the actuator driver 36 and H-bridge amplifiers 38. When the servo loop shifts functional configuration from track seeking to track following, the bias force causes the head to move off of track centerline until the lead-lag compensation circuitry integrates the error signal induced by the bias force. The actuator structure 18 must resettle at the centerline before data can be safely written or reliably read to or from a selected data storage surface.

Figure 2:
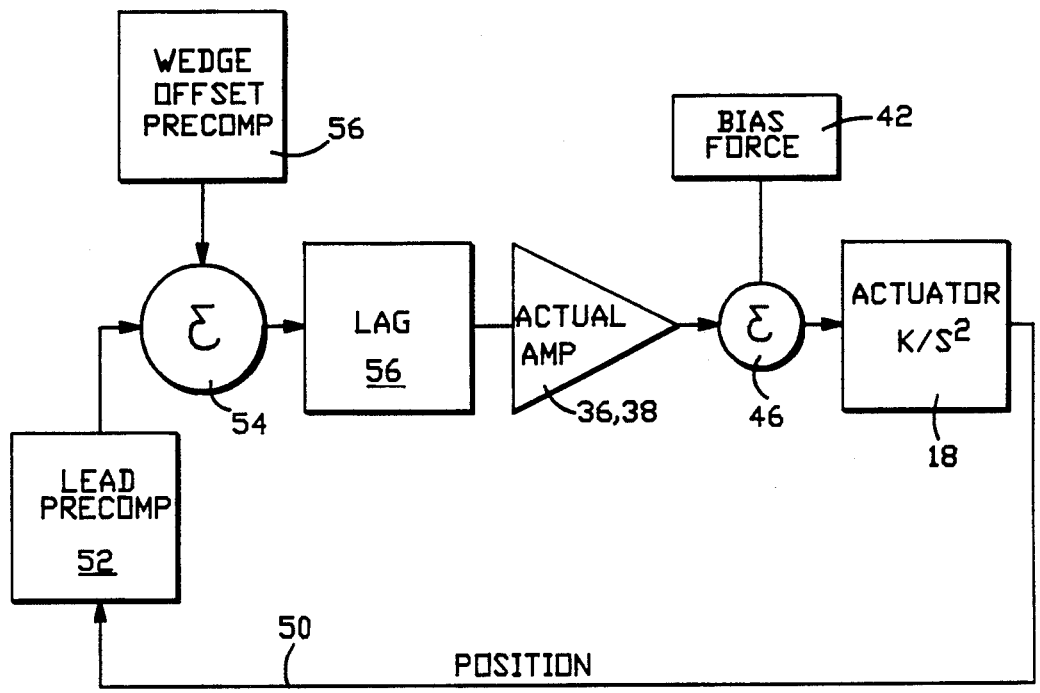
FIG. 2 is a more detailed functional block diagram of the FIG. 1 servo loop.

A track following servo loop structure 44 is outlined in FIG. 2. Therein, the servo loop structure 44 is seen to include the actuator driver 36 and H-bridge amplifier 38 which cause track following currents to be supplied to the actuator 18 through a node 46 which is graphed diagrammatically as a summing junction. The node 46 also adds a bias force from a source thereof 48 to the driving current from the H-bridge amplifiers 38, so that the driving forces actually applied to the actuator structure 18 include an electrical component (from the H-bridge amplifiers 38) and a mechanical component (bias force from the source thereof 48).

Head position values are put out from the actuator 18, via the servo head 22 continuously, and from the selected data head 20 as it passes over the single servo sector. The POS A and POS B quadrature values are put out over a line 50 to a phase lead precompensation circuit 52 which precompensates the position values for phase lead. The circuit 52 puts out a lead precompensated position error signal to a summing junction 54 at which point the wedge servo offset precompensation values from the source 42 thereof (as processed in the microprocessor 26) are added to the signal put out by the precompensation circuit 52. A lag circuit 56 then supplies phase lag correction to the summed position error signal and it passes to the actuator driver 36 and H-bridge amplifiers 38. The lead precompensation circuit 52, summing junction 54, and lag circuit 56 are functionally present within the servo controller 34.

Figure 4A:
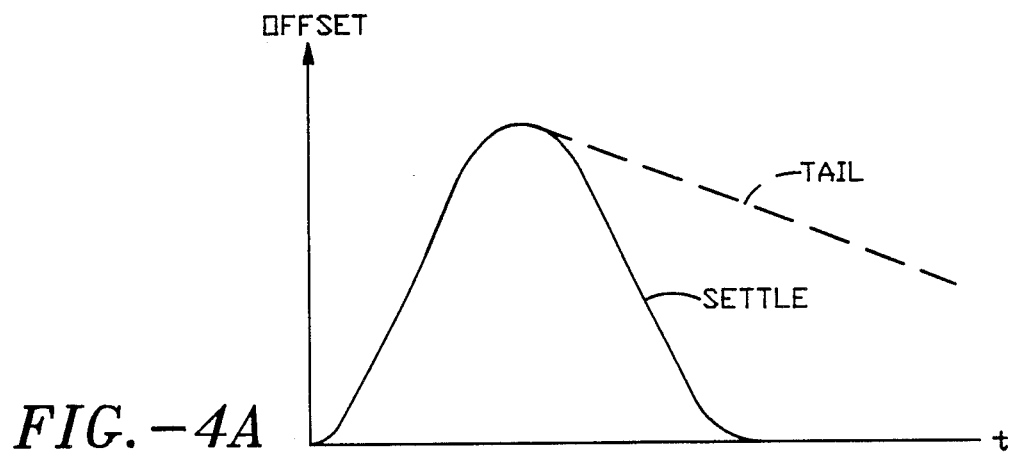
FIGS. 4A, 4B, 4C and 4D are a series of graphs of control signals and signal responses, showing improved settle time response resulting from practice of the method of the present invention.

With non-zero bias force stemming from a source 48 thereof, the phase compensation circuitry including the lead circuit 52 and lag circuit 58 must integrate the position error in order to provide the proper error signal drive to the actuator driver 36 and H-bridge amplifiers 38. The integration process typically creates a long decay period or "tail" as labelled in FIG. 4A, as the integrator is charged through a very large value resistor.

Figure 3:
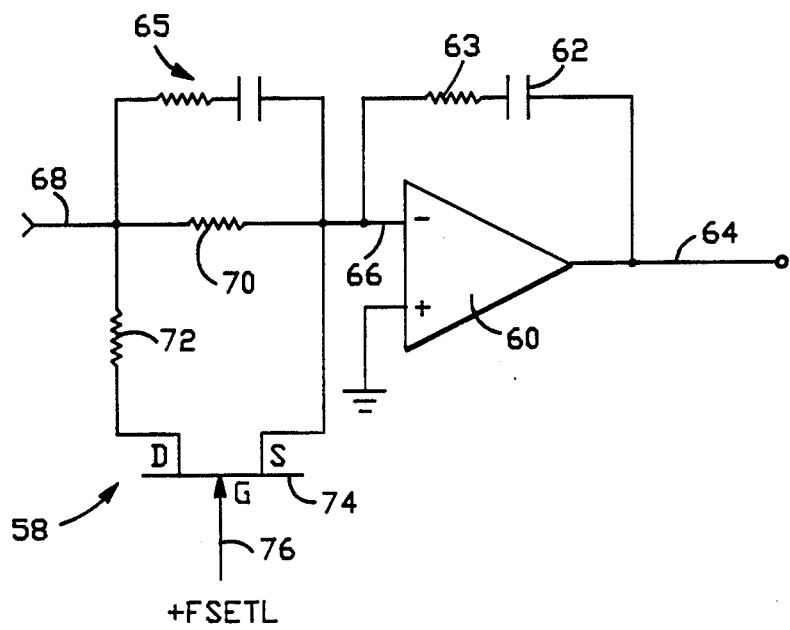
FIG. 3 is a schematic circuit diagram of the bias force integrator network of the FIGS. 1 and 2 servo loop in accordance with the principles of the present invention.

In accordance with the principles of the present invention, the lag circuit 56 of the servo controller 34 includes a settle circuit 58 as a portion thereof, as shown in FIG. 1. The settle circuit 58 is shown in greater circuit detail in FIG. 3 and includes an operational amplifier 60, configured as an integrator by virtue of a large value capacitor 62 in a feedback loop also including a series resistor 63 leading from an output 64 to an inverting input 66 of the operational amplifier 60.

The position error signal appearing at an input node 68 of the settle circuit 58 includes a component equal to the non-zero bias force when the servo loop switches to track following mode. This error signal causes an imbalance (potential difference) between the output 64 and the input 68. Since the feedback path from the input 68 passes through a high value resistor 70, the integrating capacitor 62 charges (integrates) relatively slowly. A resistor capacitor series network 65 provides phase lead compensation. As explained so far, the settle circuit 58 is conventional in structure and function.

Figure 4B:
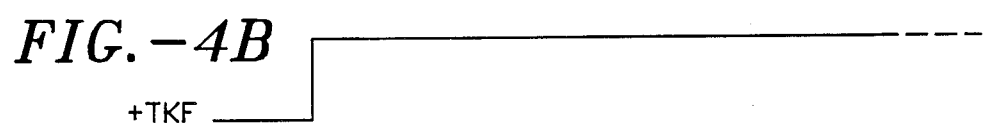
Figure 4C:
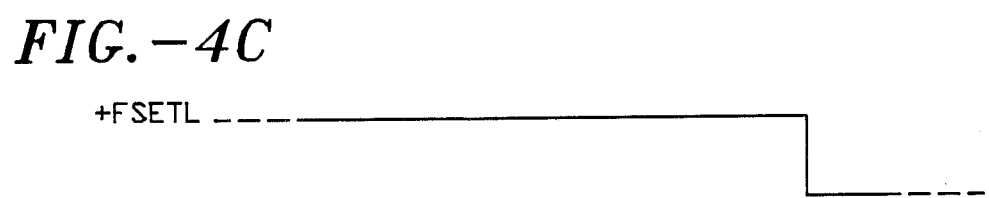

In order to overcome the long "tail" and cause the actuator to settle at track centerline very quickly, a lower value resistor 72 is selectively shunted across the resistor 70 by a transistor switch 74 operating under the control of the microprocessor 26 via a control line 76 carrying a fast settle or +FSETL control signal (FIG. 4C).

Figure 4D:
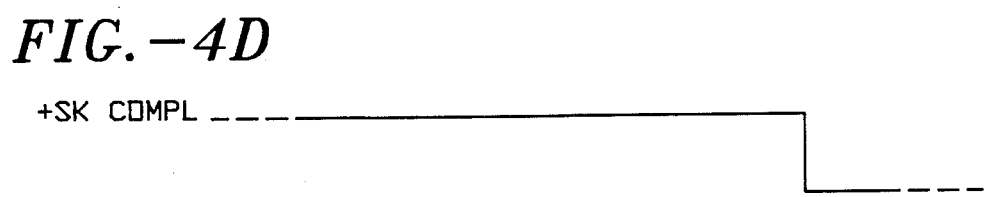

As shown in the FIG. 4B graph the track following command +TKF goes positive, marking in time the switchpoint between track seeking and track following phases of the servo. As a consequence, the actuator structure 18 and data head 20 rapidly move off of track centerline by virtue of the non-zero bias force emanating from its source 48. At the moment that the +TKF signal becomes true, the +FSETL signal is true, which causes the transistor switch 74 to operate, thereby placing the resistor 72 in parallel across the higher value resistor 70. The shunt resistance provided by the resistor 72 causes the integrator capacitor 62 thereupon to charge quite rapidly. This rapid charge rate causes the servo loop to move the actuator structure to position the data head 20 at track centerline, as graphed by the graph segment SETTLE in FIG. 4A. When the segment SETTLE has passed, the +FSETL signal transitions to a logical low, and at the same time, a minus seek complete or −SK COMPL control signal (FIG. 4D) becomes true, marking the completion of a shortened settle time interval, even in the presence of the bias force upon the actuator 18. The +FSETL and −SK COMPL signals are generated and put out by the microprocessor 26 to control data read/write operations within the disk drive 10.

In the settle circuit 58, the capacitor 62 has a preferred nominal capacitance value of 0.18 microfarad, the resistor 63 is five thousand ohms, the resistor 70 is two hundred thousand ohms, and the shunt resistor 72 is fifty thousand ohms. With this circuit arrangement, the improvement in settle time for average seeks (one-third stroke of the rotary actuator structure 18) was measured at approximately 1.35 milliseconds, a considerable difference within small, high performance disk drives. The phase margin of the servo loop decreased from 47 degrees to 35 degrees with the shunt resistor 72 connected in parallel with the resistor 70.

To those skilled in the art to which the present invention pertains, many applications and widely differing embodiments will be suggested by the foregoing example without departing from the spirit and scope of the present invention. Thus, it is to be understood that the descriptions and the disclosures herein are by way of example only and should not be deemed as limiting the scope of the invention, as more particularly set forth in the following appended claims.

What is claimed is:

1. In a lead-lag compensation circuit within a disk drive head positioner servo loop for integrating a fed back position error signal, the compensation circuit including an integrating capacitor and a high value resistor through which the integrating capacitor is charged by the position error signal, an improvement for shortening integration time of the circuit during track settling comprising:

parallel resistance means switchably connectable across the high value resistor for lowering the resistance thereof, switching means for switchably connecting the parallel resistance means across the high value resistor in response to a switching signal, and control means responsive to the head positioner servo loop for generating the switching signal to cause the switching means to connect the parallel resistance means across the high value resistor during a settle interval immediately following completion of track seeking motion when the servo loop is functioning in a track following mode and before track seeking is complete.

2. The compensation circuit set forth in claim 1 wherein the circuit includes an operational amplifier, and wherein the integrating capacitor is within a feedback path between an output of the amplifier and an inverting input thereof.

3. The compensation circuit set forth in claim 1 wherein the switching means comprises a field effect transistor having a source-drain path in series with the parallel resistance means, and having a gate path leading to the control means.

4. The compensation circuit set forth in claim 1 wherein the control means comprises programmed digital microprocessor controller means for controlling head positioning operations of the disk drive in accordance with data storage and retrieval requests received by a host computing system with which the disk drive is operating.

5. The compensation circuit set forth in claim 4 wherein the digital microprocessor controller means generates a seek complete signal for signalling completion of track seeking.

6. The compensation circuit set forth in claim 5 wherein the seek complete signal is timed to coincide with the switching signal.

* * * * *